Figure 1:
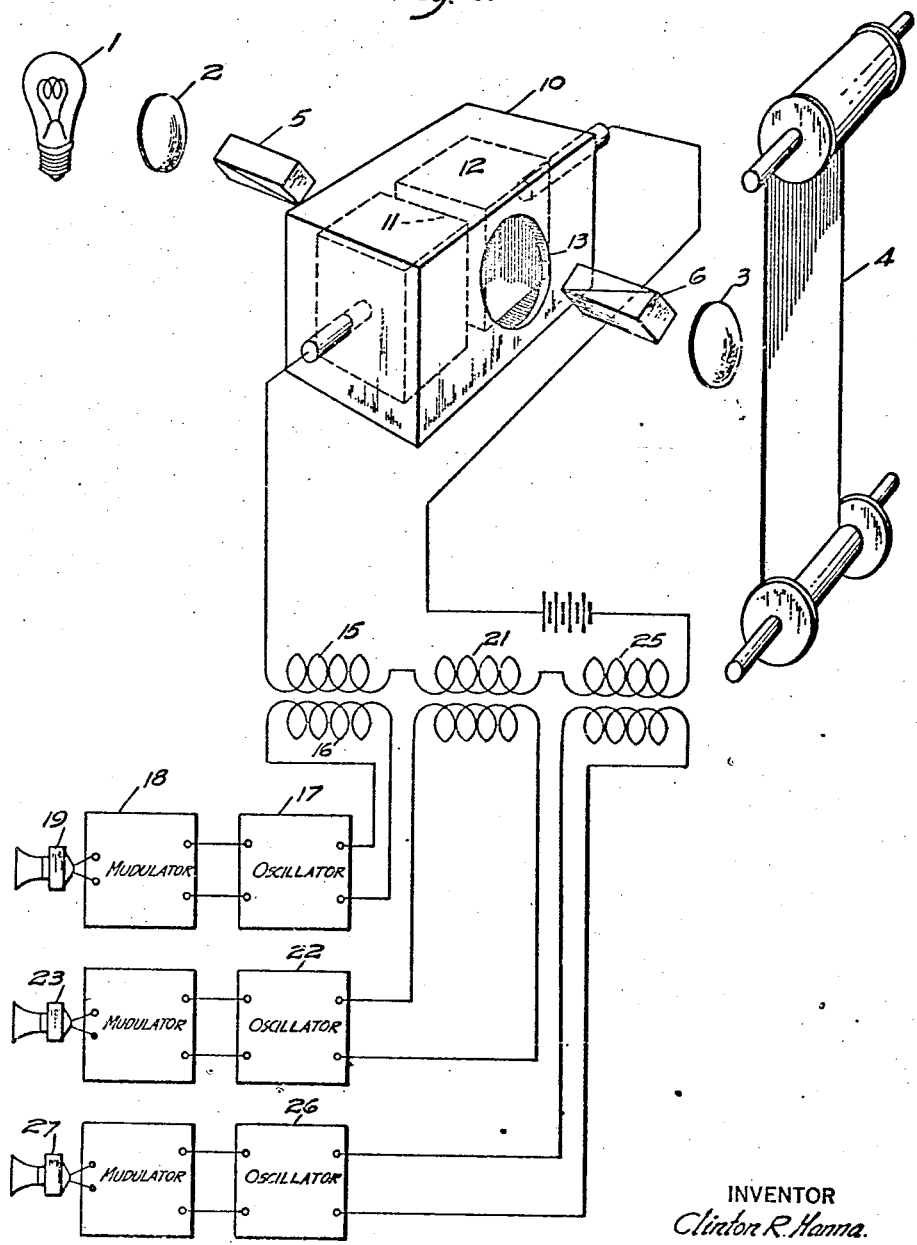

March 15, 1932. C. R. HANNA 1,849,488
MULTIPLEX TRANSMISSION
Filed March 27, 1928 2 Sheets-Sheet 2

INVENTOR
Clinton R. Hanna.
BY
ATTORNEY

Patented Mar. 15, 1932

1,849,488

UNITED STATES PATENT OFFICE

CLINTON R. HANNA, OF EDGEWOOD, PENNSYLVANIA, ASSIGNOR TO WESTINGHOUSE ELECTRIC & MANUFACTURING COMPANY, A CORPORATION OF PENNSYLVANIA

MULTIPLEX TRANSMISSION

Application filed March 27, 1928. Serial No. 265,064.

This invention relates to the recording and reproducing of sound. More specifically, the invention concerns a system for the photographic recording of sound upon a moving-picture film and a reproduction of the sound at the time when the film is used for the reproduction of the picture.

One of the known systems for recording sound varies the light admitted to the photographic film by varying the potential across a Kerr cell through which polarized light passes.

It has been proposed to impress upon the Kerr cell, a carrier frequency modulated in accordance with the sound to be recorded. In the system thus proposed, as is explained in further detail in the application of V. K. Zworykin for photographic sound recording, Serial No. 194,495, filed May 26, 1927, and assigned to the Westinghouse Electric & Manufacturing Company, the Kerr cell under the influence of a carrier current, acts upon the polarized light sufficiently to illuminate the film in accordance with the average amplitude of the carrier current.

The modulation of the carrier current in accordance with the sound produces a corresponding change in the average value of that current and thus, in the average value of the illumination. Only the changes in average value appear on the developed film as changes in intensity, because the individual periods of the carrier frequency are too closely spaced upon the film to be separately seen. The intensity changes therefore, make a record of the sound.

It is an object of my invention to provide for the recording of a variety of sounds upon the same area of the photographic film.

It is a further object of my invention to provide a plurality of carrier currents of different frequencies, to modulate each of them in accordance with an individual sound or signal and to impress all of them upon the same Kerr cell.

It is a further object of my invention to provide means by which the modulation corresponding to any one of the individual records may be separated from the others and a sound produced therefrom.

It is a further object of my invention to provide a system whereby the operator of a moving-picture projector machine may exercise a choice, at will, among the several sounds to be produced simultaneously with the picture.

It is a further object of my invention to provide a record having a plurality of different sound programs or signal messages recorded upon the same area thereof and to provide means whereby any one of said programs may be rendered or any one of said messages delivered without being confused by the presence of the others in the same record.

Figure 2:
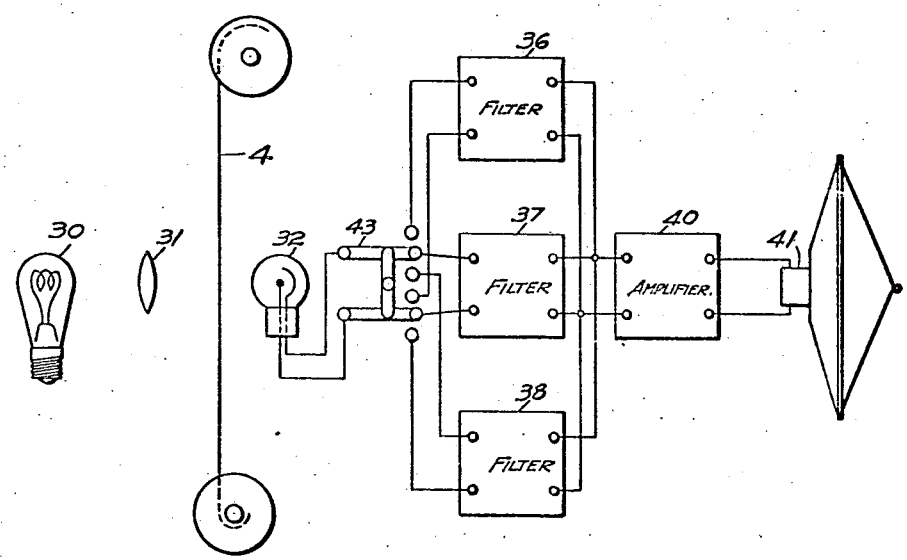
Figure 3:
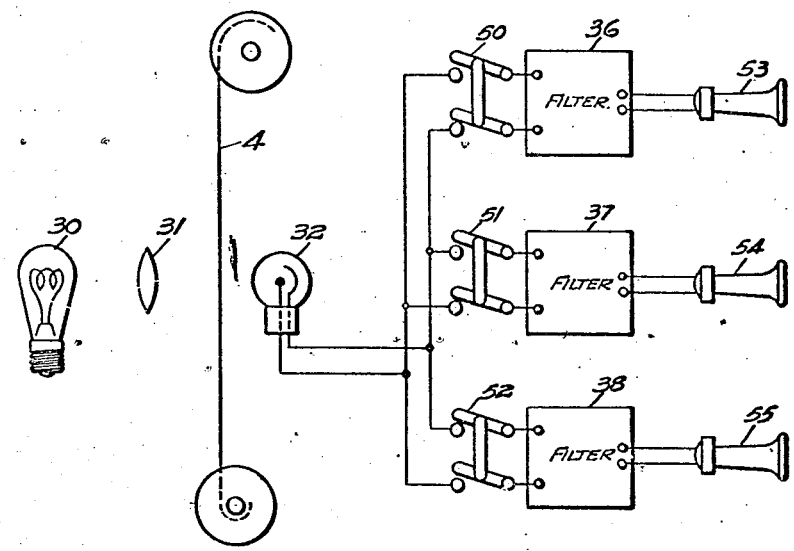

Other objects of my invention and details of the construction will be apparent from the following description, when read in connection with the accompanying drawings, in which, Figure 1 is a diagram, partly in perspective, of the circuits and apparatus used for recording, Fig. 2 is a diagram illustrating one form of the reproducing apparatus, and Fig. 3 is a similar diagram illustrating a modification.

The lamp 1 in Fig. 1 represents any convenient light source which, by means of a system of lenses, indicated by the lenses 2 and 3, is brought to a focus upon a point, preferably near the edge, of a photographic film 4. Between the first and the last lenses of the optical system, a Nicol prism 5 is inserted to polarize the light and a Nicol prism 6 to analyze it.

It is usual practice to place the polarizer, the Nicol prism 5, so that the plane of polarization is at an angle of 45° with the plane of the inter-electrode space in the Kerr cell and to place the analyzer, the Nicol prism 6, at an angle of 90° with the plane of polarization. When the bias voltage is properly chosen, the analyzer may be in the same plane as the polarizer if preferred.

Between the Nicol prisms 5 and 6, a Kerr cell 10 is placed, having electrodes 11 and 12, so located that the light emerging from the prism 5 must pass between them. Windows on opposite sides of the Kerr cell, one of which is shown at 13 and the other of which is not shown, provide for the passage of the light.

The electrodes 11 and 12 are connected to a plurality of transformer secondaries in series. The secondary 15 is supplied, through the primary 16, with current from an oscillation generator 17. The amplitude of the oscillations generated by the oscillator 17 is controlled by a modulator 18, in response to the sound received at a microphone 19.

In the same way, the secondary 21 receives oscillations from the oscillator 22 which are modulated in accordance with the sound received at the microphone 23, and the secondary 25 receives oscillations from the oscillator 26, modulated in accordance with the sounds received at the microphone 27. The oscillators 17, 22 and 26 supply different carrier frequencies, and the microphones 19, 23 and 27 are located where they will receive different sound programs.

The several secondaries 15, 21 and 25 are connected in series with the Kerr cell and a source of potential by which the cell is biased to its most effective average potential.

Instead of microphones and modulators, a means of any other form for impressing a signal upon the carrier current may be employed. For example, a key or a relay controlled by a key may stop and start oscillations from one of the generators, to give telegraphic signals.

In the reproducing device shown in Fig. 2, a light source 30 is concentrated by means of a lens system indicated by the lens 31 upon a photo-cell 32. Any suitable mechanical arrangement, such as the film-driving mechanism of an ordinary moving-picture projector, may be used to cause the film 4 to travel across the path of light. The portion of the film upon which the sound record has been made, by the exposure just described, followed by photographic development, is located where it will intercept the light beam.

Associated with the photocell 32 is a plurality of electric filters 36, 37 and 38 so designed that they are capable of transmitting frequencies corresponding to the carrier frequencies from the oscillators 17, 22 and 26, respectively, and are not capable of transmitting frequencies differing therefrom by more than the side bands produced by the modulation.

An amplifier 40, which is illustrated as connected to the output side of the filters, is intended to indicate any mechanism for producing sufficient audio-frequency current from the output of the filters. It may include a detector or detectors, as well as high-frequency or audio-frequency amplifiers, if necessary. Also, any desired portion of this mechanism may be located immediately at the output of the photo-cell 32 instead of at the output of the filters, if the current from the photo-cell is not of a suitable character for filtering.

The output of the amplifier is connected to a loud-speaker system. This is illustrated by a loud speaker, shown at 41 as of the cone type.

A switch 43 is provided between the photo-cell 32 and the filters, by means of which the input to any one of the filters may be connected to the photo-cell. As illustrated, this connection is direct, but, as stated above, the connection may be through detecting or amplifying apparatus, if necessary. The loud speaker 41 is intended to be located in an auditorium containing a screen, upon which the pictures from the picture record upon the film 4 will be projected.

In the modification shown in Fig. 3, the film 4 may or may not include a picture record. This modification is suitable for use with records intended for messages, as distinguished from entertainment, although it is capable of being used for entertainment, when desired. When used for intermingled signal records, the several carrier frequencies may be audio-frequencies but when several different spoken messages or sound programs are recorded on the same film, the carrier-frequencies are preferably all super-audio.

The light source 30, lens system 31 and photo-cell 32 in Fig. 3 are like the corresponding parts described in connection with Fig. 2. The output from the photo-cell 32 is connected to a switching system. The connection may include amplifiers and detectors, if necessary. Preferably, the switching system includes switches 50, 51 and 52 by means of which any or all of the filters 36, 37 and 38 may be connected to the photo-cell. The respective outputs of the filters are connected to telephones 53, 54 and 55, preferably adapted for the use of single individuals although, if sufficient amplification is employed, a loud speaker, which may be listened to by a group of persons, may be substituted for any one of these telephones.

Amplifiers may be inserted at any desired point in the system illustrated by Fig. 3, although, if a sufficiently sensitive photo-cell is employed, it is entirely possible to operate the telephone instruments directly from the current supplied by the photo-cell without the interposition of any amplifiers. The rectifying effect of the telephone instruments themselves can serve as a substitute for a detector.

In the operation of the device, the film 4 in Fig. 1 is caused to pass from one spool to the other, and the point at which the lens system 2—3 focuses the light from the source 1 thus traces a longitudinal path upon the film. During the travel of the film, a sound program, which may be either a message or an entertainment program, is impressed upon one of the microphones. The program may if desired, be a succession of interruptions according to a predetermined code, as in the keying system already mentioned.

The carrier current from the corresponding oscillator is modulated in accordance with the message or sound, in the usual way, and a corresponding modulation of the average value of the light delivered to the film occurs, whereby the program is recorded upon the film.

While the film travels from one spool to the other, and the program is recorded as just described, another program may be impressed upon another of the microphones. This program will be recorded in the same way upon the same longitudinal path on the film. The two records will be superposed, and any ordinary reproducing apparatus will give a confused sound if controlled by such a film. If desired, a third sound program may be impressed upon the third microphone during the same or another passage of the film from one spool to the other. The resulting film will then have three different records, all superposed upon the same longitudinal path.

While the film, with its commingled sound records, is used to record a picture program as well, the picture may be recorded either during the making of the sound record or at a different time, as desired.

If a film be used for sound recording, unaccompanied by pictures, either a film much narrower than is ordinarily used for picture recording can be used, or many sound records side-by-side may be made upon the same film. Each of these sound records may be a commingled record, as explained in connection with the single longitudinal path upon the picture film, or, if desired, one or more of the longitudinal paths may be used for the recording of a single-sound program.

When the records have been impressed upon the film, it is developed by any process usual in photography.

When the record of picture and sound is placed in the apparatus indicated in Fig. 2, the portion of the film containing the record passes between the light source 30 and the photo-cell 32. As the film passes from one spool to another, the operation of light upon the photo-cell varies in accordance with the commingled record. It, therefore, produces, in the output of the photo-cell, a plurality of carrier wave frequencies, each modulated in accordance with a different sound program.

If the switch 43 be in the position illustrated in Fig. 2, only the carrier frequency which the filter 37 can transmit will be received at the amplifier 40. Therefore, the amplifier will be actuated by current corresponding to the output of the oscillator 22, and will contain a modulation corresponding to the sound received at the microphone 23. The loud speaker 41 will, therefore, reproduce the sound which was impressed upon the microphone 23. Similarly, if the switch 43 be in the upper position, the sound produced by the loud speaker 41 will be like that impressed upon the microphone 19 and if the switch be in its lower position, the sound from the loud speaker 41 will correspond to the program delivered to the microphone 27.

In the form illustrated in Fig. 3, the film 4 may also carry a picture but this form of reproducing apparatus is particularly adapted to records of sound programs alone or of spoken or code messages. This apparatus delivers to the switching system a current which reproduces the commingled record of all the programs, as explained in connection with Fig. 2. If the switch 50 is closed, the filter 36 will extract from the commingled currents that, corresponding to the carrier current, from the oscillator 17. The program impressed upon the microphone 19 will thus be reproduced in the telephone 53. Likewise, if the switch 51 is closed, the program impressed upon the microphone 23 will be reproduced in the telephone 54, and, if the switch 52 is closed, the telephone 55 will give sounds corresponding to the sounds which were delivered to the microphone 27. If all three switches are closed, the three telephones will each deliver its own program unaffected by the other. Likewise, by substituting keys or relays for the microphones and modulators, the telephone may be made to reproduce telegraphic messages.

Obviously, other translating devices instead of sound-producing devices may be used as indicators of the message when desired.

My invention can be applied, too, to a signalling system in which the light beam serves to transport the signals. In such a system, the photocell 32 of Fig. 2 or 3 will replace the film 4 of Fig. 1, the lamp 30 and optical system 31, as well as the film being omitted.

Although I have illustrated and described three oscillators producing three carrier currents, and three corresponding filters in the reproducing apparatus, it is obvious that a larger or smaller number of different carrier currents may be employed. The number of different carrier currents which may be employed is limited only by the efficiency of the filters and the necessary separation of frequencies to provide for the side bands.

Although I have described and illustrated only a limited number of specific embodiments of my invention, many other embodiments are possible and I do not wish to be limited except as required by the prior art and indicated in the claims.

I claim as my invention:

1. A commingled photographic sound record comprising as its components the imprint of individual signals of different carrier frequencies each of said components indicating the modulation of its carrier, whereby the signal corresponding to said modulation may be reproduced.

2. A commingled photographic record of a plurality of periodic electrical phenomena comprising as its components the imprint of periodic electrical phenomena of respectively different frequencies, each of several components indicating the modulation of its respective phenomena, whereby phenomena having like modulations may be reproduced from said record.

3. In combination, a plurality of sources of sound modulated carrier-frequency current of respectively different frequencies, photographic means for recording the currents from said sources upon the same area, means for producing a current modulated by said record and means whereby the modulation of said produced current may be made to correspond to the modulation of any selected one of said carrier-frequency currents.

4. In combination, a photo-electric device, a source of light, a photographic sound record controlling the illumination of said device by said source, said record comprising as its components the imprint of a plurality of individual signals, said individual signals each having, respectively, a carrier frequency independently modulated, a plurality of filters each selectively conductive to one only of said carrier frequencies, with its modulations, switching connections whereby the current from said photo-electric device may be directed to any of said filters, and a translating device controlled by said current.

5. In a signal system, a plurality of oscillation generators each of a different frequency, modulation devices each controlled by a different signal and controlling the respective oscillation generators, light controlling means including a Kerr cell, means for impressing the oscillations upon said cell, a photo-sensitive moving surface illuminated through said cell whereby a commingled record of all the modulations is obtained upon said surface, and means for obtaining from said surface a reproduction of any selected one of said signals.

6. The method of record sound signalling which comprises simultaneously photographically recording upon the same area of a record surface, a plurality of different carrier frequencies differently modulated, producing from said record a complex frequency composed of said carrier frequencies mingled together, selecting and separating one of said frequencies and translating the modulation thereof into a perceptible sound signal.

In testimony whereof I have hereunto subscribed my name this 22nd day of March, 1928.

CLINTON R. HANNA.